Oct. 11, 1955   J. F. BRINKMEYER   2,720,293
AUTOMATIC SAFETY BRAKING SYSTEM
Filed Dec. 1, 1952   2 Sheets-Sheet 1
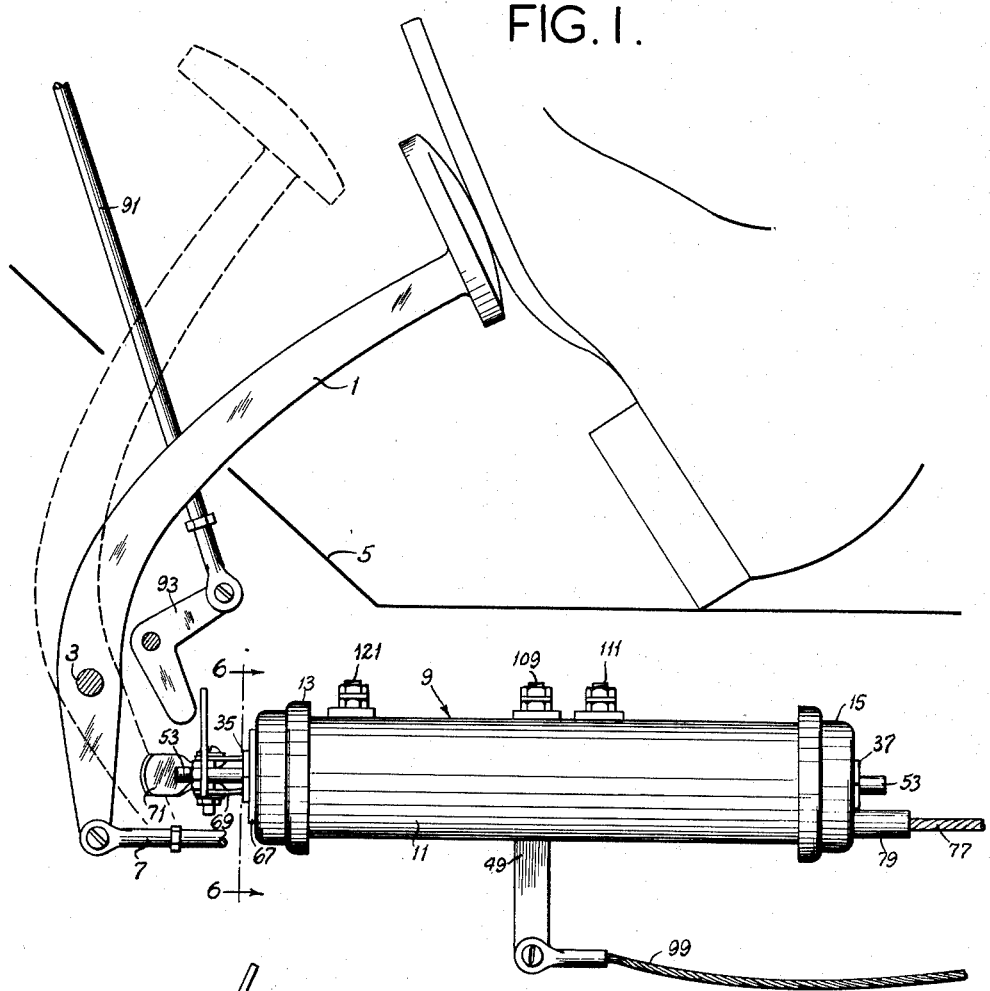
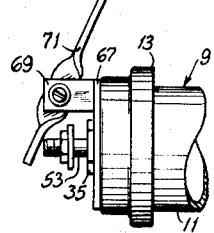
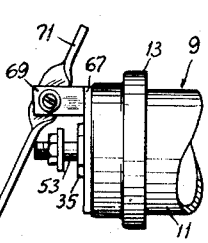
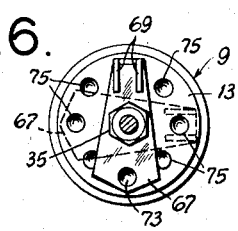
John Frederick Brinkmeyer,
Inventor.
Koenig and Pope,
Attorneys.

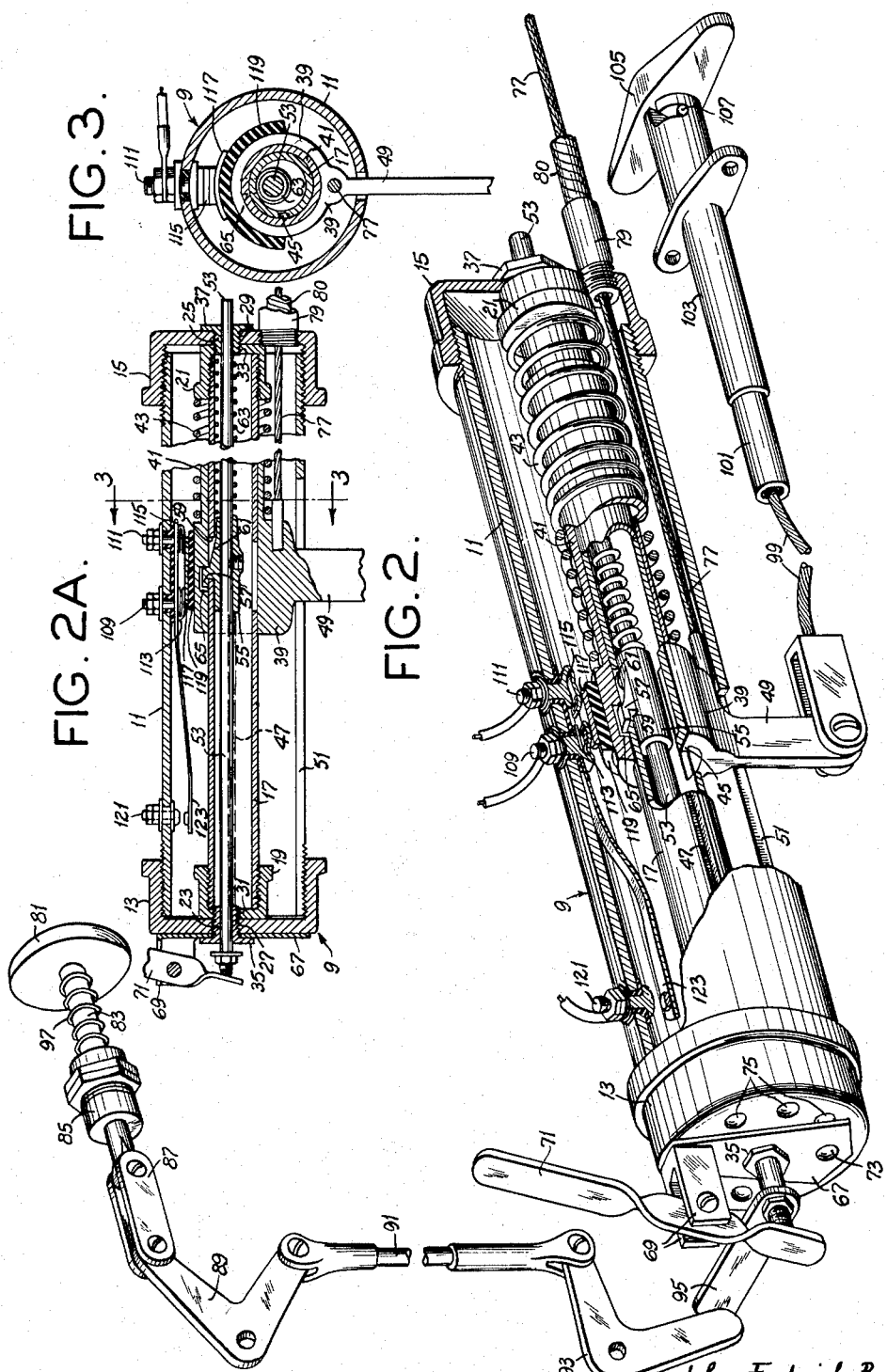

United States Patent Office 2,720,293
Patented Oct. 11, 1955

2,720,293

AUTOMATIC SAFETY BRAKING SYSTEM

John Frederick Brinkmeyer, St. Louis, Mo.

Application December 1, 1952, Serial No. 323,471

15 Claims. (Cl. 192—3)

This invention relates to emergency braking systems, and more particularly to apparatus for automatically applying the emergency or parking brake of a motor vehicle if the primary vehicle brakes fail to operate upon actuation of the brake pedal.

It is well known that many accidents result from failure of the fluid braking system of a motor vehicle. Such failures may be due to loss of fluid (whether hydraulic fluid or air) from the braking system, excessive brake wear, or other causes. Upon loss of fluid, for example, application of the vehicle brake pedal is ineffective to brake the vehicle, and the driver loses control of the vehicle except by using the hand-operated emergency or parking brake. However, in many circumstances it is impossible for the driver to apply the emergency brake by means of the usual hand lever in time to avoid an accident.

Among the several objects of this invention may be noted the provision of an improved emergency braking system which is operative automatically to apply the emergency brake upon operation of the brake pedal in the event of failure of the fluid braking system; the provision of a braking system of this class in which the emergency brake is automatically applied whenever the brake pedal is pushed in farther than its normal travel, without reliance upon foot pressure to apply it; the provision of a braking system of this class allowing for normal usage of the emergency brake when the fluid braking system is in order, and also allowing for quick-setting of the emergency brake by hand independently of the brake pedal either when the fluid braking system is in or out of order; the provision of a braking system of this class having means for releasing the emergency brake subsequent to its application in an emergency; the provision of a braking system of this class having means for automatically switching off the ignition system of the vehicle and switching on the stop light upon the emergency operation of the emergency brake; and the provision of a braking system of this class having parts which are economical to manufacture and which may be readily and economically installed on all types of existing vehicles and which require only minor vehicle alterations. Other objects and features will be in part apparent and in part pointed out hereinafter.

The invention accordingly comprises the structures hereinafter described, the scope of the invention being indicated in the following claims.

In the accompanying drawings, in which one of various possible embodiments of the invention is illustrated:

Fig. 1 is a semi-diagrammatic view illustrating my invention;

Fig. 2 is a perspective with parts broken away and shown in section;

Fig. 2A is a longitudinal section;

Fig. 3 is a cross-section taken on line 3—3 of Fig. 2A;

Figs. 4 and 5 are fragmentary views illustrating two different possible positions of an operating lever of the invention; and, Fig. 6 is a section taken on line 6—6 of Fig. 1.

Corresponding reference characters indicate corresponding parts throughout the several views of the drawings.

The invention is herein illustrated as applied in a motor vehicle having a conventional primary hydraulic brake system and a conventional mechanically operated emergency or parking brake. Such hydraulic brake systems and such emergency or parking brake arrangements are conventional and well known, and hence are not herein illustrated. It will suffice to say that the hydraulic brakes are under control of a brake pedal lever 1 pivoted at 3 under the floorboard 5 of the vehicle and coupled to the piston in the master cylinder of the hydraulic brake system as indicated at 7. It will also be well understood that the hydraulic brakes are operated by pushing in the pedal, and that as long as the hydraulic brake system is in order, the pedal is normally pushed in only a limited distance short of the floorboard. If, however, the hydraulic brake system should go out of order, as by loss of hydraulic fluid from the system, operation of the pedal in an effort to stop the vehicle will naturally result in the pedal being pushed in to the floorboard, or at least considerably farther than its normal travel.

I provide an emergency brake applying device generally designated 9 for automatically applying the emergency brake in response to overtravel of the brake pedal as above described. This device comprises a support in the form of a housing or cylinder 11 consisting, for example, of a length of pipe having end heads 13 and 15 threaded thereon. As related to the manner in which the cylinder 11 is mounted on the vehicle, head 13 is the forward head, and head 15 is the rearward head. Extending from one head to the other inside the cylinder 11 is a tube 17. The ends of this tube are threaded in caps 19 and 21 (see Fig. 2A). The caps are fixed to the inside of the end heads 13 and 15 by means of tubular screws 23 and 25 which extend through central openings 27 and 29 in heads 13 and 15, and which have their inner ends threaded in eccentric openings 31 and 33 in the caps. Thus, the tube 17 is mounted off-center with respect to the cylinder 11 (see Figs. 2A and 3). The screws 23 and 25 have hexagonal heads 35 and 37.

Slidable on the tube 17 is a collar or slide member 39 having a rearwardly extending sleeve 41. A coil compression spring 43 surrounds the sleeve and reacts from the cap 21 (which constitutes a fixed abutment) against the rearward end of the slide. The slide is held against rotation on the tube 17, while being slidable thereon, by a key 45 engaged in a longitudinal keyway 47 in the tube. The slide has a radial arm 49 extending through a longitudinal slot 51 in the cylinder 11.

A resilient rod 53 extends completely through the tube 17 and is loosely slidable in the tubular screws 23 and 25. The rod is axially located with respect to the cylinder 11 and eccentrically located with respect to the tube 17 (see Figs. 2A and 3). Fixed on the rod within the tube is a latch member 55 having a forwardly-open-hook-shaped detent 57 reaching into an opening 59 in the tube. In the rear of the detent 57 the latch member 55 has a cam or wedge portion 61 which inclines toward the rod in rearward direction. A coil compression spring 63 surrounds the rod and reacts from the inner end of screw 25 against the latch 55 to bias the latch and the rod in forward direction.

The rod is normally held by the spring 63 in a forward position in which detent 57 engages the forward end of the opening 59 and projects beyond the tube 17 into a detent opening 65 in the slide 39 thereby to latch the slide in a rearward retracted position with spring 43 loaded (Figs. 2 and 2A). Upon rearward movement of the rod 53 and latch member 55, the cam edge 61 engages the rearward end of the opening 59 and the rod is bent to withdraw the detent 57 from opening 65, whereupon member 39 is driven forward by the spring 43. In the retracted position of member 39, the rearward end of opening 65 engages the back of the detent 57, and it will be understood that as the rod 53 is moved rearward, the member 39 will also be moved somewhat rearward until the detent 57 has been withdrawn from opening 65.

Held against the forward end head 13 by the flange 35 on screw 23 is a bracket plate 67. This has forwardly extending arms 69 in which is pivoted a lever 71 one end of which is engageable with the forward end of the rod 53. The plate 67 has a boss 73 engageable in any one of a series of depressions 75 in the end head 13 for holding the plate and the lever 71 in any one of various angular positions. The depressions are arranged on a circle concentric with screw 23. The lever 71 may be mounted either as shown in Figs. 1–4 or in Fig. 5.

The cylinder 11 is mounted in fixed position on the frame of a vehicle by being attached to the frame by any suitable means (not shown) in position for engagement of the lever 71 by the brake pedal lever 1 with sufficient lost motion as between levers 1 and 71 that lever 71 is operated only upon overtravel of the brake pedal, and with the arrangement such that when lever 71 is operated by lever 1 upon overtravel, the rod 53 is driven rearward to unlatch member 39. The adjustability of the bracket plate 67 and the potentiality of locating the lever 71 in the two different positions shown in Figs. 1–4 and 5 take care of different installation requirements on different vehicles. A flexible cable 77 is attached at its forward end to the member 39. This cable extends through a pipe 79 threaded in an opening in the rear end head 15 and at its rearward end is attached to the emergency brake operating mechanism of the vehicle (not shown). The cable 77 may be sheathed as indicated at 80.

The rod 53 is also adapted for manual operation through a linkage operable by a knob 81 on a push rod 83 slidable in a bushing 85 in the dashboard of the vehicle (not shown). The rod 83 has its inner end linked as indicated at 87 to a bell crank lever 89 in turn connected by a rod 91 to another bell crank lever 93. The latter is adapted to engage a bar 95 fixed to the forward end of the rod 53. A spring 97 acts against the knob 81 to bias the entire linkage to a retracted position. By pushing the knob 81, the rod 53 may be driven rearward to release the member 39.

A flexible cable 99 is attached at its forward end to the arm 49. This is attached at its rearward end to a rod 101 slidable in a sleeve 103 fixed, for example, in the wall of the luggage compartment of the vehicle (not shown). The rod 101 has a handle 105 at its outer end, and may be latched to the sleeve 103 by a bayonet type latch such as indicated at 107. When the member 39 and arm 49 are in the retracted position of Fig. 2, cable 99 is loose enough to permit member 39 to move forward to apply the emergency brake.

Fixed in the wall of cylinder 11 is a hot line terminal 109 and immediately to the rear of this terminal is an ignition line terminal 111. These have spring contacts 113 and 115 in the cylinder 11 which are electrically connected by a contact plate 117 fixed on a block of insulation 119 on member 39 when member 39 is in retracted position, thereby to complete the ignition circuit of the vehicle. When member 39 is released and driven forward by the spring 43, plate 117 moves out of bridging relation with respect to contacts 113 and 115, and the ignition circuit is thereby broken. Fixed in the wall of cylinder 11 adjacent its forward end is a stop light terminal 121, and adapted for engagement with this terminal is a leaf spring contact arm 123 fixed at one end to the hot line terminal 109. When member 39 moves forward, it engages arm 123, and moves it into engagement with stop light terminal 121 to switch on the stop light of the vehicle (not shown).

Operation is as follows:

Normally the member 39 will be latched in the retracted position shown in Figs. 2 and 2A by the detent 57, and spring 43 is loaded. As long as the primary vehicle brakes are in order, operation of the brake pedal lever 1 has no effect on lever 71 and the rod 53, since the travel of the lever 1 is insufficient for it to engage the lever 71. Also, the emergency brake may be applied at any time by the usual emergency brake hand lever, this being permitted simply by slacking of the cable 77.

If the primary vehicle brakes fail, as upon loss of fluid, and the driver makes an attempt to stop the vehicle by applying the brake pedal, the natural result is that the pedal is pushed in farther than its normal travel, usually all the way to the floorboard. Upon such overtravel of the pedal, the lever 71 is operated to drive the rod 53 rearward. This results in bending of the rod 53 and withdrawal of the detent 57 from the member 39 in the manner previously explained, whereupon member 39 is driven forward by the spring 43 to apply the emergency brake. Spring 43 may be selected to apply the emergency brake without causing unduly rapid braking. Thus, the emergency brake is automatically applied by spring 43 without reliance on foot pressure upon the first attempt by the driver to apply the primary brakes subsequent to their failure, and the application of the emergency brake is accomplished in a much shorter time than possible by normal hand application of the emergency brake. Upon application of the emergency brake, the ignition system of the vehicle is automatically switched off and the stop light is switched on in the manner previously explained.

To release the emergency brake subsequent to its application as above described, the cable 99 is pulled rearward by handle 105, thereby to slide member 39 rearward on the tube 17 and compress the spring 43. Member 39 is moved rearward to the point where detent 57 enters opening 65 in member 39 to latch it in retracted position. Outward movement of detent 57 occurs due to the return bias effected by the bending of the rod 53. It will be understood that when the rod 53 is driven rearward, and thereby bent to withdraw detent 57 from opening 65 by the action of cam 61, the detent takes a position in opening 59 with its forward end abutting the forward end of opening 59 to keep it from being moved forward by spring 63. As member 39 is driven forward, sleeve 41 closes the opening 59 and engages the outer face of the detent 57 to keep the detent from springing radially outward under the bias of the bent rod 53. Following the release of the emergency brake, the handle 105 is pushed back in the sleeve 103 and latched by bayonet latch means 107, and this slacks off cable 99 to allow the requisite travel of arm 49 for emergency brake application.

The driver may quickly apply the emergency brake at any time independently of the brake pedal lever 1 and the emergency brake hand lever by pushing knob 81. This releases the member 39 to be driven forward by spring 43 to apply the emergency brake in the manner previously explained. This feature is advantageous, for example, in an emergency situation in which for some reason the brake pedal is jammed and cannot be pushed in to operate the primary brakes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An emergency braking system for a vehicle having a primary braking system operated by a foot pedal and having an emergency brake, the pedal having a limited travel as long as the primary braking system is in working order, and overtravelling upon failure of the primary braking system, comprising a spring, a latch for holding the spring loaded, means operable by the pedal upon overtravel thereof for releasing the latch to release the loaded spring, means for connecting the spring and the emergency brake whereby the released spring applies the emergency brake, and manually operable means independent of the pedal for releasing the latch.

2. An emergency braking system for a vehicle having a primary braking system operated by a foot pedal and having an emergency brake, the pedal having a limited travel as long as the primary braking system is in working order, and overtravelling upon failure of the primary braking system, comprising a slide, means for connecting the slide to the emergency brake, a spring for driving the slide in one direction to apply the emergency brake, a latch for holding the slide in a retracted position with the spring loaded, and means operable by the pedal upon overtravel thereof for releasing the latch, the means connecting the slide to the emergency brake comprising a cable adapted to slack off to allow normal operation of the emergency brake when the slide is retracted.

3. An emergency braking system for a vehicle having a primary braking system operated by a foot pedal and having an emergency brake, the pedal having a limited travel as long as the primary braking system is in working order, and overtravelling upon failure of the primary braking system, comprising a housing, a tube extending from end-to-end of the housing, a member slidable on the tube, a spring for driving said slide member in a forward direction, a resilient rod extending through the tube and slidable in openings in the ends of the housing, a latch member on the rod having a detent reaching into an opening in the tube and adapted to project out of said opening in the tube when the rod is substantially straight, said slide member having a rearward retracted position in which the spring is loaded determined by projection of the detent into an opening in the slide member, said latch member having a cam portion adapted upon rearward movement of the rod to effect bending of the rod to withdraw the detent from the opening in the slide member, means biasing the rod in forward direction, said rod being movable rearward against its bias upon overtravel of the pedal, and means for connecting the slide member to the emergency brake.

4. An emergency braking system as set forth in claim 3 wherein the slide member has a radial arm projecting through a slot in the housing, and a cable is connected to the arm for manually retracting the slide member.

5. An emergency braking system as set forth in claim 3 wherein the means for connecting the slide member to the emergency brake comprises a cable extending through an opening in the rearward end of the housing.

6. An emergency braking system as set forth in claim 3 wherein the housing carries hot line and ignition terminals and the slide member has a contact plate which electrically connects the terminals when the slide member is in retracted position, and which moves away from the terminals with the slide member when the latter is driven forward.

7. An emergency braking system as set forth in claim 6 wherein the housing carries a stop light terminal adjacent its forward end, and wherein a leaf spring contact arm is fixed at one end to the hot line terminal and is adapted to be engaged with the stop light terminal by the slide member when the slide member is driven forward.

8. An emergency braking system as set forth in claim 3 wherein the housing carries a lever engageable with the rod for driving it rearward and engageable by the brake pedal lever of the vehicle.

9. An emergency braking system as set forth in claim 8 wherein the lever is carried by the housing for location in any one of a plurality of different positions.

10. An emergency braking system as set forth in claim 3 wherein the housing has a bracket at its forward end rotary on the axis of the rod, a lever pivotally carried by the bracket engageable with the rod for driving it rearward and engageable by the brake pedal lever of the vehicle, and means for holding the bracket and lever in any one of a plurality of different angular positions.

11. An emergency braking system as set forth in claim 3 wherein the rod is eccentrically located with respect to the tube.

12. An emergency braking system as set forth in claim 3 further comprising a linkage including a push rod having a knob for quick manual operation of the resilient rod to drive it rearward independently of the brake pedal.

13. An emergency braking system for a vehicle having a primary braking system operated by a foot pedal and having an emergency brake, the pedal having a limited travel as long as the primary braking system is in working order, and overtravelling upon failure of the primary braking system, comprising a support mounted in fixed position on the frame of a vehicle, a member movably mounted on the support, means for connecting said member to the emergency brake, said support including a spring abutment also fixed relative to the frame of the vehicle, a spring reacting from said abutment and acting on said member for driving said member in direction to apply the emergency brake, a latch carried by the support for latching said member in a retracted position with the spring loaded, and means operable by the pedal upon overtravel thereof for releasing the latch, said connecting means allowing normal operation of the emergency brake when said member is in retracted position.

14. An emergency braking system as set forth in claim 13 wherein the said member is a slide and the spring is a compression spring.

15. An emergency braking system as set forth in claim 14 wherein the support comprises a spring housing, the slide is slidable within the housing, and the spring abutment is at one end of the housing.

References Cited in the file of this patent

UNITED STATES PATENTS

| | | |
|---|---|---|
| 1,519,213 | Moore | Dec. 16, 1924 |
| 2,189,192 | Brock et al. | Feb. 6, 1940 |
| 2,254,349 | Brock et al. | Sept. 2, 1941 |
| 2,499,276 | Mullins et al. | Feb. 28, 1950 |
| 2,519,774 | Letner | Aug. 22, 1950 |
| 2,574,255 | Eye et al. | Nov. 6, 1951 |